Feb. 2, 1960     K. V. ALLEN     2,923,093
SEED PLANTING MAT
Filed April 11, 1958
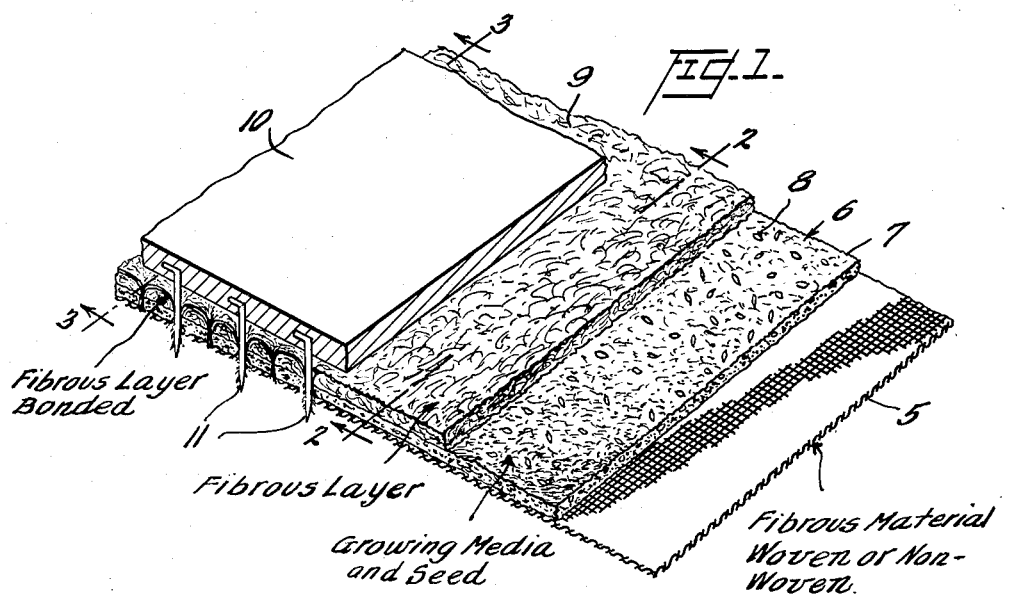
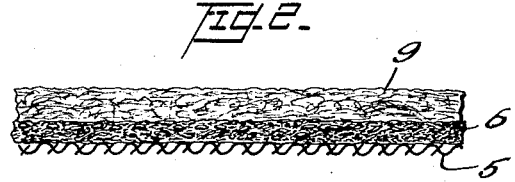
INVENTOR
Kenneth V. Allen,
BY
ATTORNEYS

United States Patent Office 2,923,093
Patented Feb. 2, 1960

2,923,093

SEED PLANTING MAT

Kenneth V. Allen, Sag Harbor, N.Y., assignor to Troy Blanket Mills, New York, N.Y., a corporation of New Hampshire Application April 11, 1958, Serial No. 727,888

7 Claims. (Cl. 47—56)

The following specification relates to an improved seed planting mat or the like and the novel method of making it.

In the broadcasting of seed for crops and in particular for the growth of sod, it is most desirable to combine several essential operations. In one respect the broadcasting of seed should be accompanied by an even distribution of growing media, fertilizer and other adjuncts for the successful production of a crop. Furthermore, it is of course essential that the seed thus planted must be protected by a cover, mulch or the like. To provide a convenient form of materials so that these results may be obtained with the minimum of field operations, and that the materials may be stored, transported and applied with the greatest convenience, this invention presents an improved article of commerce. Incidental to this article, the invention also includes a novel method of producing the article of commerce in an economical and expeditious manner.

One of the objects of the invention is to produce a convenient composite article which will include loose seed, nutrient materials, a cover and a backing member.

Among the objects of the invention is to insure even distribution of the seed in planting.

It is a further object of the invention to provide protection to the seed bed against wind, erosion, and the depredation of birds and other garden pests.

A characteristic feature of my invention is to produce an improved plant seeding mat of excellent appearance similar to the pile surface of a carpeted area.

A further object of my invention is to provide a seeding mat which will be easily penetrated by the growing leaves of grass and similar plants.

As described hereinafter, the invention also includes the provision of a fibrous mass of temporary protection, but which on exposure on the open ground will gradually disintegrate and form a desirable mulch.

Finally it is characteristic of this improved product that it is manufactured by an easy, novel method and produces an economical product.

The preferred form of the invention has been illustrated on the accompanying drawings on which:

Fig. 1 is a perspective view of the improved mat in the process of manufacture;

Fig. 2 is a transverse vertical section of the unformed mat shown on the line 2—2 of Fig. 1 and Fig. 3 is a similar section of the completed mat taken on the line 3—3 of Fig. 1.

Briefly described, the invention consists in a mat of three superposed layers which can be bound together for storage, transportation and use with the greatest convenience. The product has a backing or base layer of loose fibrous material upon which an intermediate layer of the desired seed growing media, fertilizer and the like, is spread evenly. The top layer consists of a second fibrous layer which serves as a cover, and the fibres of which can be driven through the intermediate layer and fastened to the backing layer by needling or the like.

By way of example I have shown a base or backing layer 5. This layer may consist of loosely matted fibres properly oriented and forming a porous foundation. The layer has been shown as formed of interwoven fibres, although unwoven fibres are equally suitable in view of the subsequent steps of manufacture.

A layer 6 consists of a mass 7 of growing media, solid fertilizers, composed mulch and the like. This forms a holding member in which seeds 8 are evenly distributed.

The layer 6 is covered by a cover layer 9. This is of loose fibres matted together. These fibres may be either natural fibres, synthetic plastic, glass wool, or the like. The desired property is of being capable of felting and subsequently suffering gradual disintegration on exposure.

In order to bind the several layers together, I use a suitable method of attaching the fibres of the cover layer 9 through the material layer 6 and into the base or backing layer 5. In Fig. 1, this is accomplished by a needling operation. The board 10 is equipped with a large number of barbed needles 11. These needles extend over the entire lower surface of the board.

The operation of needling is well known in the production of felt and similar textile products. In the present instance the board 10 is slightly reciprocated vertically, so that the needles will penetrate the mat from the top to the bottom. In this operation the barbs on the needles 11 will pick up individual fibres from the top layer 9 and carry them down into the backing layer 5. The fibrous ends are not withdrawn with the needles so that they remain as fastening means between the two layers. By the regular advance of the mat under the reciprocating board 10, this needling operation is carried out at random or selected points over the entire surface of the mat. The result is that the fibres of the upper layer are passed indiscriminately through the intermediate layer at the zone of penetration and anchored in the backing layer.

The result is the customary appearance of a felted textile product. In Fig. 2, the layers have been illustrated before the needling operation.

In Fig. 3 the characteristic operation of needling individual fibres has been illustrated to form different loops. However it is well known that needling customarily attaches one end only of individual fibres so that the looped effect is not the only one, but the characteristic surface is that of loosely projecting fibre ends attached at the opposite ends to the backing layer.

The production of a seed planting mat in the above manner is an essential part of the invention as it is believed to be a novel method for this purpose.

The mat thus produced is a convenient article for packaging and storage. It can be readily transported and applied for the planting purpose.

It provides a composite body of seed, growing media, reinforcing backing and cover layer all in one article. This permits easy handling and even distribution of the seed.

When spread upon the area to be covered, it protects the seed from wind. The seed will not be disturbed by rain or washing away. Birds and other garden pests will be prevented from robbing the seed bed of the seed.

Finally this surface of good appearance is easily penetrated by the growing grass, while the fibres suffer gradual disintegration on exposure so that in the final result a light mulch is left over the area.

While I have illustrated the preferred form of the invention and described the essentially novel features of both method and product, it is to be understood that

What I claim is:

1. An improved package comprising a fibrous backing layer, an intermediate loose mass of mixed material and a fibrous cover with numerous spaced individual fibres thereof looped through the intermediate mass at random points and their ends held in the interstices of the backing layer.

2. An improved package comprising a fibrous backing layer, an intermediate loose mass of mixed material and a fibrous cover with numerous spaced individual fibres thereof extending through the intermediate mass at random points and anchored to the backing layer.

3. An improved seed planting mat comprising a fibrous backing layer, an intermediate layer of evenly distributed seed in a loose mass of growing media and fertilizer, and a cover of fibrous material in which the ends of numerous spaced fibres are held by the backing layer.

4. An improved seed planting mat comprising a fibrous backing layer, an intermediate layer of evenly distributed seed in a loose mass of growing media and fertilizer, and a cover of fibrous material having some of its loose fibre ends needled through the intermediate layer and through the backing layer.

5. An improved seed planting mat comprising a felt backing layer, an intermediate layer of evenly distributed seed in a loose mass of growing media and fertilizer, and a cover of fibrous material in which numerous spaced ends of the fibres are felted into the backing layer.

6. The method of forming a seed planting mat which comprises spreading a mixture of growing media, seed and fertilizer evenly over a loose backing layer, covering the mixture with a loose fibrous top layer and commingling numerous random loose ends of fibres from the top layer with the fibres in the backing layer.

7. The method of forming a seed planting mat which comprises spreading a mixture of growing media, seed and fertilizer evenly over a loose backing layer, covering the mixture with a loose fibrous top layer and needling numerous random fibres of the top layer through the mixture and into the backing layer.

References Cited in the file of this patent

UNITED STATES PATENTS

| | | |
|---|---|---|
| 526,512 | Weber et al. | Sept. 25, 1894 |
| 2,192,939 | Slayter | Mar. 12, 1940 |
| 2,243,857 | Fischer | June 3, 1941 |
| 2,826,865 | Chohamin | Mar. 18, 1958 |